Figure 1:
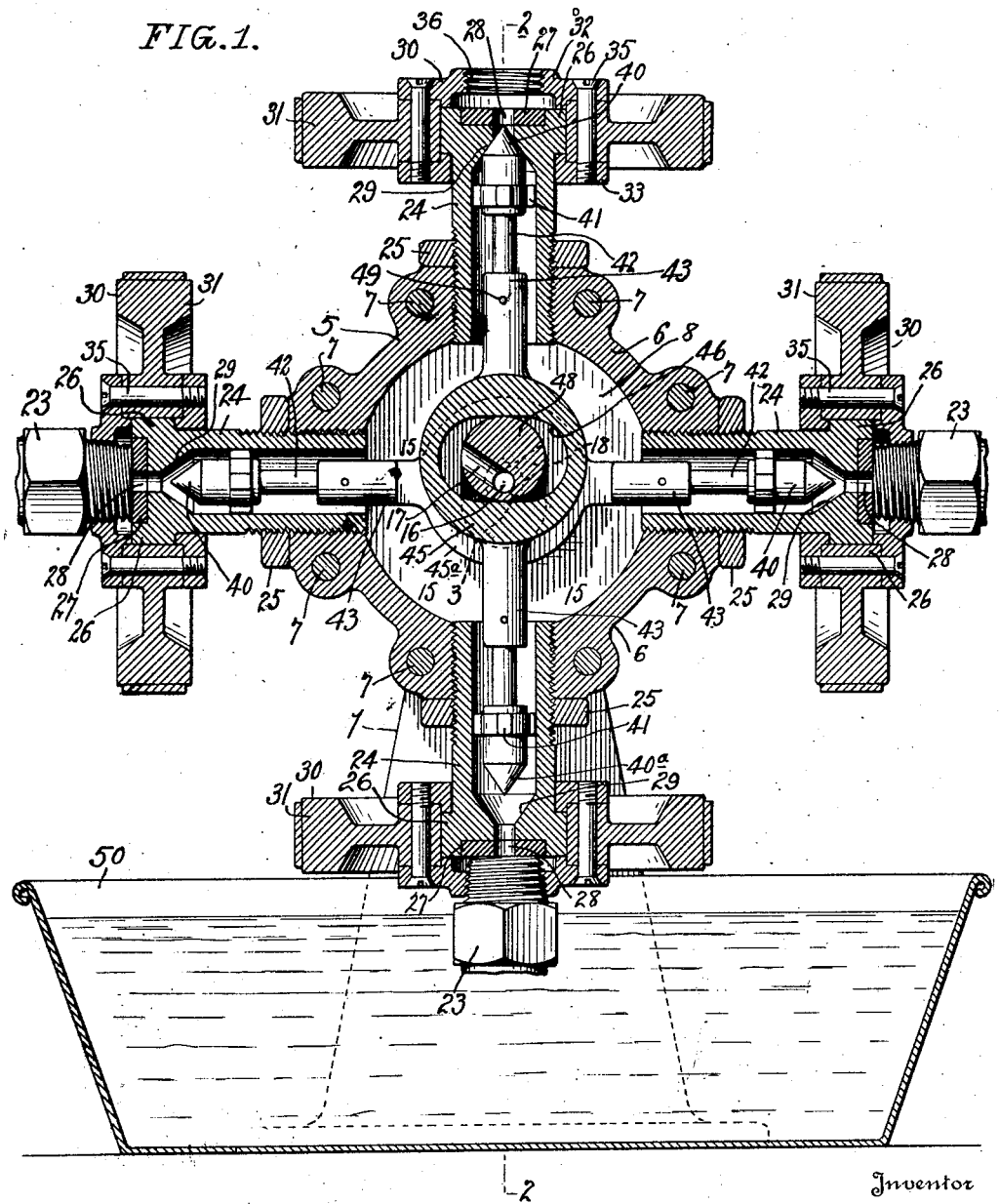

July 13, 1926.  
W. B. GRIFFITH  
TESTING MACHINE  
Filed Feb. 4, 1924

1,592,298

2 Sheets-Sheet 1

Inventor  
William B. Griffith  
By F. DeWitt Goodwin  
Attorney

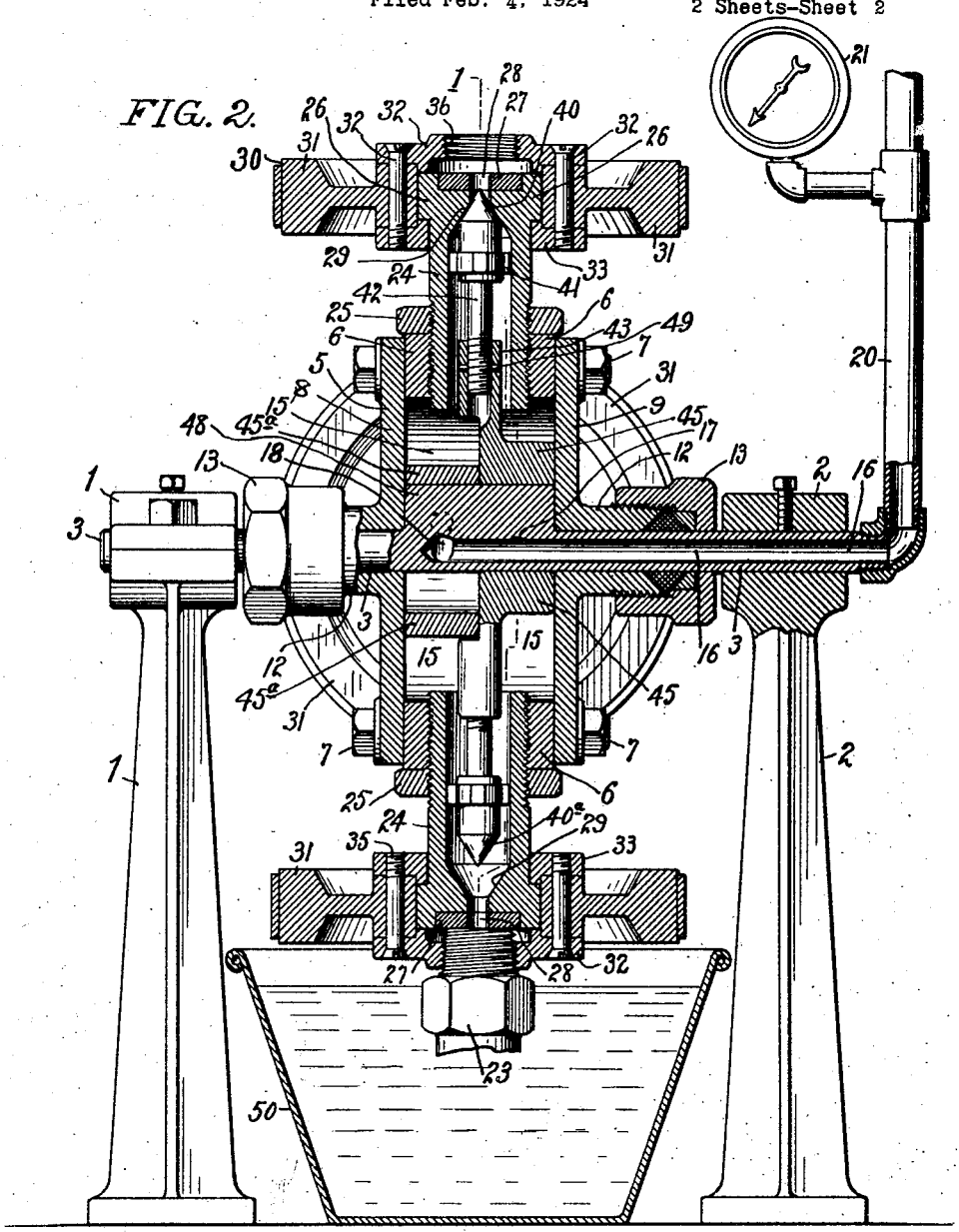

Patented July 13, 1926.

1,592,298

UNITED STATES PATENT OFFICE.

WILLIAM B. GRIFFITH, OF PHILADELPHIA, PENNSYLVANIA, ASSIGNOR TO STAR SPRINKLER CORPORATION, A CORPORATION OF NEW JERSEY.

TESTING MACHINE.

Application filed February 4, 1924. Serial No. 690,361.

My invention relates to improvements in testing machines and particularly testing machines adapted for testing valves, sprinkler heads, spark plugs and similar devices for retaining pressure.

The object of my invention is to provide a machine adapted for rapidly testing devices whereby large quantities of these devices may be tested in a minimum amount of time; a further object of my invention is to provide a machine having means for readily attaching and detaching the devices to be tested; a still further object of my invention is to provide a machine having a constant pressure therein to which the devices to be tested are subjected; a still further object is to provide a machine having a plurality of outlet ports into which a number of devices may be inserted and tested during one revolution of the machine; and a still further object is to embody in the machine valves and valve operating mechanism adapted for automatically opening and closing the ports during the testing operation of the machine, whereby one port will be closed for the removal of a device which has been tested and the insertion of a device to be tested, and the other ports will be open, thus subjecting certain of the devices to the testing pressure; these together with various other novel features of construction and operation of the several parts, which will be more fully hereinafter described and claimed, constitute my invention.

Referring to the accompanying drawings, Fig. 1, is a central vertical sectional view of my improved testing machine, as on line 1—1 Fig. 2; and Fig. 2, is a vertcal sectional view as on line 2—2 Fig. 1.

In the drawings in which like reference characters refer to like parts, 1 and 2 represent bearings in which is rigidly supported a shaft 3. Rotatably mounted upon the shaft 3 is a casing 5, comprising an annular body portion 6 tightly secured by bolts 7, to end disks 8 and 9. Said disks are provided with central bearing sleeves 12, rotatably mounted upon the shaft 3 and provided with stuffing boxes 13 for preventing leakage of the pressure medium from the chamber 15, formed within the casing 5. Said pressure medium may be air, oil, water, or the like, which is conveyed to said chamber 15 through the passageway 16 and the other openings 17 and 18 formed in the shaft 3, which latter is connected with a supply pipe 20, leading from a constant source of supply. Said pipe being provided with a pressure gauge 21 adapted to indicate a pressure at which the device is being tested.

The annular body portion 6 is provided with threaded apertures into which are adjustably secured valve sleeeves 24 arranged diametrically opposite each other and secured in their adjusted positions in relation to the body portion by lock nuts 25.

Rotatably mounted upon each valve sleeve 24 is a securing member 30, adapted for attaching a device 23 to be tested and tightly holding the same upon the end of the valve sleeve 24. Said securing member 30 consists of a hand wheel 31 adapted to rotate freely upon the enlarged head 26 formed upon the valve sleeve 24. Cheek plates 32 and 33 are secured upon opposite sides of the hand wheel 31 by bolts 35, and engage opposite faces of the head 26, thus permitting the securing member 30 to rotate freely upon the head 26 and also preventing any movement of the securing member 30, in relation to the longitudinal axis of the valve sleeve 24. The outer cheek plate 32 is provided with a threaded aperture 36, adapted to have a device 23 screwed into said aperture 36, by rotating the hand wheel 31 in relation to the device 23, thus tightly clamping the device 23 upon the packing washer 27 embedded in a recess formed in the end surface of the valve sleeve 24. so as to prevent any leakage of pressure between the device 23 and the end of the valve s'eeve 24.

The valve sleeve 24 is provided with a port 28 and also a conical valve seat 29. A conical valve 40 is provided to engage said seat 29 and close the port 28. The body of the valve 40 is provided with guide lugs 41 which hold the water valve centrally in the valve sleeve 24. A valve rod 42 is secured in a sleeve 43 forming part of a collar 45 having an elongated aperture 46 which is occupied by an eccentric 48 upon the shaft 3. When the casing 5 is rotated about the eccentric 48, the collar 45 will move the valve 40 to and from the valve seat 29, and open and close the port 28 formed in the valve sleeve, communicating with the device 23 to be tested.

In the form of my invention shown in the drawings, two valves 40 and 40ᵃ are mounted in alignment upon opposite sides of the collar 45. Thus as the casing 5 is rotated about the eccentric 48, when one valve will be in the closed position the opposite valve will be in the open position, the latter valve admitting the pressure medium to the device 23 to be tested.

There are also two collars 45 and 45ª shown in the drawings for operating two pairs of valves 40, thus providing a machine adapted to receive four devices to be tested. The collars 45 and 45ª are mounted upon the same eccentric 48 which is of sufficient length to extend through both collars. The collars 45 and 45ª are placed side by side within the casing and the valve rod sleeves 43, are off-set so that all the valve rods and valves will be positioned in the same plane. The valve rods 42 are threaded in the sleeves 43 and also secured by pins 49 to prevent their turning axially.

The valve 40 and the valve seat 29 may be relatively adjusted by screwing the threaded portion of the valve sleeve 24, into the body portion 6 and then securing said sleeve by the lock nut 25, thus providing means for adjusting the valves without the necessity of having access to the interior of the casing 5. The eccentric 48 is provided with two apertures 17 and 18, so as to prevent the collars from at any time closing off the supply of pressure from the hollow shaft 3. By this arrangement one of said apertures will always be uncovered.

The operation of my invention is as follows: The devices 23 to be tested are screwed into the securing members 30 by turning the hand wheels and holding the devices from turning. The pressure, either air or water, is admitted to the chamber 15, of the casing 5. The casing 5 is rotated by hand about the shaft 3, and as it is rotated the eccentric will open and close the valves. The valve shown at the top of the drawings is in the closed position and when so closed a device 23 to be tested may be inserted or removed without pressure escaping through the port 28. The remaining valves, as shown in the drawings, are in the open position thus admitting the pressure to three of the devices to be tested.

When air is used as the medium for testing the devices a pan 50 is provided containing water so that any leaks in the devices may be readily detected as they are turned around with the casing and are submerged in the water. When water is used as the testing medium this pan is not necessary as a water-leak will show upon any imperfect device.

I claim:—

1. A testing machine comprising a body portion having an outlet port formed therein, said body portion adapted for detachably receiving a device to be tested in communication with said port, a shaft upon which the body portion is rotatably mounted, a valve within the body portion, and means actuated by the shaft when the body portion is rotated thereon for actuating the valve in relation to said outlet port.

2. A testing machine comprising a body portion having an outlet port formed therein, said body portion adapted for detachably receiving a device to be tested in communication with said port, a shaft upon which the body portion is rotatably mounted, said shaft having a passageway formed longitudinally through the same adapted to convey a pressure medium into the body portion, a valve and means actuated by the shaft for moving the valve for controlling said outlet port.

3. A testing machine comprising a body portion forming a pressure casing having outlet ports formed therein, securing devices upon the body portion adapted for readily attaching and detaching devices to be tested in communication with said outlet ports, a shaft extending through said body portion, a valve mounted within the body portion, and means operatively associated with said shaft and said valve for successively closing and opening said outlet ports when the body portion is rotated upon the shaft.

4. A testing machine comprising a body portion having an outlet port formed therein, a shaft rotatably mounted in relation to the body portion, said shaft having a passageway formed therethrough adapted for conveying a continuous pressure medium into the body portion, a valve means operatively associated with said shaft and said valve for moving the latter in relation to said outlet port when the body portion is rotated in relation to said shaft, and a securing member upon the body portion adapted for detachably holding a device to be tested in communication with said outlet port.

5. A testing machine comprising a body portion forming a pressure chamber, a shaft upon which the body portion is rotatably mounted, bearings in which said shaft is rigidly secured, said body portion having an outlet port formed therein, said body portion adapted to detachably receive a device to be tested by pressure passing through said outlet port to said device, a valve mounted within the body portion, and means actuated by said shaft for moving said valve to and from said outlet port for closing and opening the latter when said body portion is rotated upon the shaft.

6. A testing machine comprising, a body portion having a source of pressure medium connected therewith, a cylindrical head upon the body portion, said head having an outlet aperture formed therethrough, a securing member rotatably mounted upon said head, a cheek plate upon said securing member, said cheek plate having an aperture formed therethrough in communication with said outlet aperture in the head, said cheek plate adapted to receive a device to be tested, and a valve mounted within the body portion for controlling the pressure medium through said head to the device to be tested.

7. A testing machine comprising, a body portion having a source of pressure medium connected therewith, a cylindrical head upon the body portion, said head having an outlet aperture formed therethrough, a securing member rotatably mounted upon said head, said securing member comprising a detachable cheek plate provided with a threaded aparture adapted for receiving a device to be tested, and a valve member within the body portion adapted for controlling the flow of the pressure medium through said head to the device to be tested.

8. A testing machine comprising, a body portion having a source of pressure medium connected therewith, a cylindrical head upon the body portion, said head having an outlet aperture formed therethrough, a securing member rotatably mounted upon said head, said securing member comprising a hand wheel mounted upon said head, a cheek plate secured to said hand wheel, said cheek plate having a threaded aperture formed therein adapted to receive a device to be tested, and a valve within the body portion for controlling the pressure medium through said head.

9. A testing machine comprising, a body portion having a source of pressure medium connected therewith, a cylindrical head upon the body portion, said head having an outlet aperture formed therethrough, a securing member rotatably mounted upon said head, said securing member having a threaded aperture formed therein in alignment with said outlet aperture formed through said head, a washer of resilient material mounted upon said head against which a device to be tested may be screwed by turning said securing member, and a valve within the body portion adapted for controlling the pressure medium through said head.

10. A testing machine comprising a body portion having a source of pressure medium connected therewith, said body portion having an outlet port formed therein, a valve seat upon the body portion located within said outlet port, a valve mounted within the body portion adapted for engaging the valve seat for closing said outlet port, and mechanism within the body portion adapted for actuating the valve.

11. A testing machine comprising, a body portion having a source of pressure medium connected therewith, a cylindrical head upon the body portion, said head having an outlet aperture formed therethrough, a securing member rotatably mounted upon said head, said head having a valve seat formed therein, a valve mounted within the head adapted for controlling the outlet aperture formed through the head, and mechanism within the body portion adapted for moving the valve in relation to the valve seat.

12. A testing machine comprising a body portion having a source of pressure medium connected therewith, a sleeve having a screw threaded portion mounted in the body portion, a valve mounted within the sleeve, a valve seat formed upon the sleeve, said sleeve having an outlet port formed therethrough adapted to be closed by said valve, a fastening device adapted to secure the sleeve upon the body portion in adjusted relation to the valve, mechanism within the body portion adapted for moving the valve for controlling said outlet port, and a securing member adapted for holding a device to be tested upon the sleeve.

13. A testing machine comprising a body portion having an outlet port formed therein, said body portion adapted for detachably receiving a device to be tested in communication with said port, a valve within the body portion adapted for controlling the flow of a pressure medium through said port, a shaft upon which the body portion is rotatably mounted, bearings in which said shaft is rigidly secured, said shaft having a passageway formed therethrough adapted for conveying a pressure medium into the body portion, and an eccentric upon said shaft adapted to actuate the valve when the body portion is rotated.

14. A testing machine comprising a body portion having a source of pressure medium connected therewith, a shaft extending through the body portion, an eccentric upon said shaft, a collar embracing said eccentric, a valve rod upon the collar, a valve upon said rod, a sleeve upon the body portion in which the valve is positioned, said sleeve having an outlet port formed therein adapted to be opened and closed by said valve when said eccentric and said body portion are relatively rotated, and a securing device adapted for holding a device to be tested in communication with said outlet port formed through the sleeve.

15. A testing machine comprising a body portion having a source of pressure medium connected therewith, a shaft extending through the body portion, an eccentric upon said shaft, a collar embracing said eccentric, valve rods mounted diametrically opposite upon said collar, valves upon said valve rods, sleeves mounted upon diametrically opposite sides of the body portion adapted to be occupied by said valves, said sleeves having valve seats formed therein adapted to be alternately engaged by said valves for controlling outlet apertures formed through said sleeves, and securing members upon said sleeves adapted for holding a device to be tested upon the sleeves.

16. A testing machine comprising a body portion having a source of pressure medium connected therewith, a shaft extending through the body portion, an eccentric upon said shaft, collars embracing said eccentric arranged in different vertical planes, valves mounted upon diametrically opposite sides of each collar, said body portion having outlet ports formed therein adapted to be opened and closed by said valves upon the body portion being rotated in relation to the shaft, and fastening devices for detachably securing devices to be tested upon the body portion in communication with said outlet ports.

17. A testing machine comprising an annular casing, end disks secured to the side facing surfaces of said casing, a shaft extending through said disks, stuffing boxes upon said disks embracing the shaft, said shaft having a passageway formed therethrough forming a supply inlet leading into the casing for a pressure medium, an eccentric upon said shaft within the casing, said casing having radially formed outlet ports formed therein, valves adapted to open and close said outlet ports, mechanism actuated by said eccentric adapted for moving said valves, and securing members adapted for detachably connecting devices to be tested upon the casing in communication with said outlet ports.

In testimony whereof I affix my signature.

WILLIAM B. GRIFFITH.